Oct. 16, 1945.   K. SARAFIAN   2,386,981
ELECTRIC CONTROL SYSTEM
Filed May 29, 1943   3 Sheets-Sheet 1

Inventor
Karl Sarafian
By Blackmore, Spencer & Flint
Attorneys

Inventor
Karl Sarafian

Patented Oct. 16, 1945

2,386,981

UNITED STATES PATENT OFFICE 2,386,981

ELECTRIC CONTROL SYSTEM

Karl Sarafian, Detroit, Mich., assignor to General Motors Corporation, Detroit, Mich., a corporation of Delaware Application May 29, 1943, Serial No. 488,950

6 Claims. (Cl. 250—27)

This invention relates to control means and more specifically to means designed to control the rate of current application to a load. There are many instances wherein it is necessary to accurately time and control power applications to a load, and, as an example, but in nowise in a limiting sense, there can be cited welding machines in which it is the present practice to apply only a few cycles of electrical current to weld. It is also desirable to be able to control the value of current of even these few cycles so that in certain installations a very small amount of power can be applied to the weld, such as where the material being welded is thin. As the materials being welded change either in physical character such as from aluminum to steel or varying thicknesses of the same metal, it is necessary to be able to adjust the control system to accommodate the varying amounts of heat and therefore power necessary to provide a proper weld. In some cases it is desirable to heat the metal relatively slowly to the fusion point, while in others it is desirable to heat it rapidly and then perhaps slowly taper off the heat.

It is therefore an object of my invention to provide a control system for applying controlled pulses to a load.

It is a further object of my invention to provide a control system wherein each cycle or pulse may be varied at will.

It is a still further object of my invention to provide a control system in which succeeding current pulses may follow a definite pattern of amplitude.

It is a still further object of my invention to provide a control system in which the succeeding current impulses may be varied as desired, or in which the total current impulses may be applied if necessary.

With these and other objects in view which will become apparent as the specification proceeds, the embodiments of my invention will be best understood by references to the following specification and claims and the illustrations in the accompanying drawings, in which:

Figure 1:
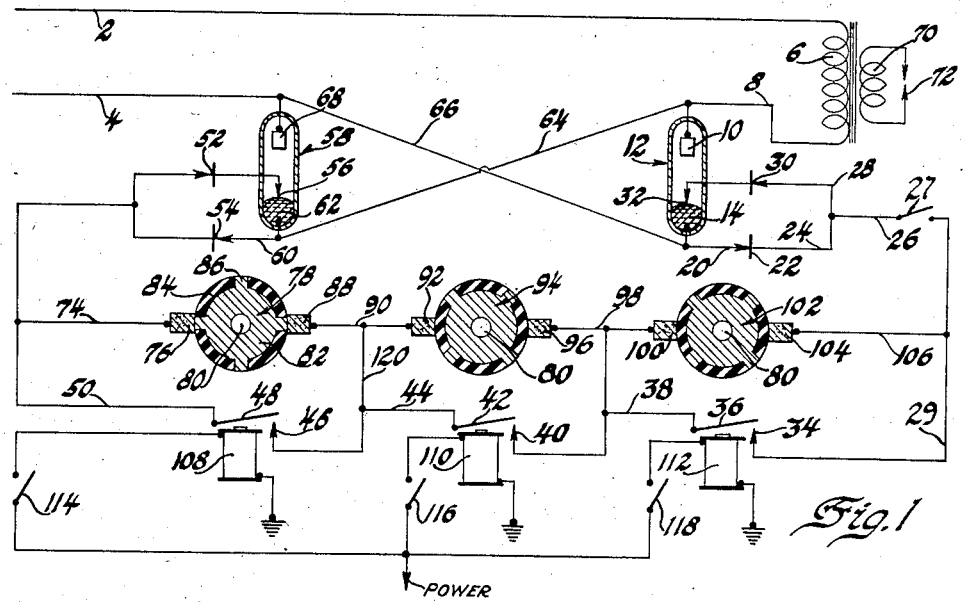
Figure 1 is a schematic wiring diagram showing a control system of my invention.

Referring now more specifically to the drawings, there is shown in Figure 1 a pair of power lines 2 and 4, the former of which is connected to one end of a transformer primary 6, the opposite end being connected by line 8 to anode 10 of an arc discharge tube 12, the cathode 14 of which is connected by line 20 to a small copper oxide rectifier 22, the opposite side of which is connected by line 24 with line 26 and line 28, the latter being connected through a second rectifier 30 with the igniting electrode 32 of tube 12. Line 26 extends to switch 27 which is connected through line 29 to the stationary contact 34 of a relay controlled switch, the armature 36 of which is connected through line 38 to a second stationary contact 40 of a second relay operating switch, the armature 42 of which is connected through line 44 with stationary contact 46 of a third relay operated switch whose armature 48 is connected through line 50 to two copper oxide rectifiers 52 and 54. Rectifier 52 is directly connected to the igniting electrode 56 of an arc discharge control device 58 and rectifier 54 is connected through line 60 to the cathode or mercury pool 62 of the tube 58. Line 64 is connected to both the cathodes 62 of the tube 58 and the plate 10 of the tube 12. Also, line 66 connects the plate 68 of the tube 58 with the cathode 14 of the tube 12.

Associated with the primary 6 of the transformer is a secondary 70 across which the load is applied, which in this case is a pair of welding contacts 72. Connected to line 50 is a line 74 which extends to a brush 76 which cooperates with rotatable commutator 78, the latter being mounted upon a shaft 80 in such a manner that it normally rotates with the same but can be arcuately adjusted around the shaft to different angular positions. This commutator consists of a central conductive portion 82 in which there are cut a series of arcuate grooves to hold arcuate insulating portions 84 but to allow a portion of the conductive center to extend out and be flush with the same at a series of angular points such as 86. As shown, the commutator has four of these conductive portions and these are placed at 90 degrees to each other so that the two opposite conductive portions will allow current to pass when they engage diametrically opposite brushes and at each 90 degrees of rotation current will be allowed to flow.

A second brush 88 diametrically opposite 76 is mounted on the same bracket therewith and is connected through line 90 with a brush 92 cooperating with a second commutator 94 of the same design as the first just described. A second brush 96 also engages the periphery of this commutator and likewise is connected through line 98 with a still further brush 100 engaging a third commutator unit 102 and having a diametrically opposite brush 104 connected through line 106 to line 26. The shaft 80 carrying the commutator members is driven by a synchronous motor (not shown) supplied from the same lines to synchronize the interruption. There are also shown three relays: 108, 110 and 112, which are connectible with a suitable source of power (not shown) and whose energizations are controlled by switches 114, 116 and 118, respectively. These last-named switches are operated by suitable timed mechanism, such as, for example, a cam member which may control all of them.

Assuming for the moment that it is desired to utilize the full current available in a given half cycle, all of the switches 48, 42 and 36 are closed and in this instance current will be applied through circuits to be described. The tubes 12 and 58 are, as before mentioned, of the mercury arc type and require an igniting circuit to be completed before they will fire or conduct. It is therefore necessary to complete a circuit through one of the igniting electrodes 32 or 56 before the tube, which has proper polarity to fire, can conduct. Let it be assumed that in this instance line 2 is positive with respect to line 4 and in that case tube 12 will be the one in condition to fire when the welding timer switch 27 is closed since its plate 10 will be at a higher potential than its cathode 14 and a circuit will be completed through its igniting electrode 32 to start the tube as follows: line 2, transformer primary 6, line 8, line 64, line 60, rectifier 54, line 50, switch 48—46, line 44, switch 42—40, line 38, switch 36—34, line 29, switch 27, line 26, line 28, rectifier 30, igniting electrode 32, line 66, line 4. The current flowing through this circuit will cause a cathode or mercury arc spot to form at the surface of the mercury pool and start the tube 12 conducting. However, as soon as the current through tube 12 goes to zero, the tube will cease conducting and since during the next half cycle the plate 10 is negative with respect to the cathode pool 14, this tube cannot conduct but will be inoperative.

However, during the next half cycle in which line 4 will be positive with respect to line 2, tube 58 will be in condition to conduct since its plate 68 will be at a higher potential than its cathode 62. As previously, in this case an ignition circuit must be provided for igniting electrode 56 and this is as follows: line 4, line 66, line 20, rectifier 22, line 24, line 26, switch 27, line 29, switch 34—36, line 38, switch 40—42, line 44, switch 46—48, line 50, rectifier 52, igniting electrode 56, cathode 62, line 64, line 8, transformer primary 6 to line 2. This as before will cause a cathode spot or surface arc to form in the tube 58 and start it conducting. The same process will, of course, occur for each succeeding cycle of current as applied from the line and as soon as the igniting electrode is energized with the proper polarity on the tube electrodes, the same will conduct each alternate half cycle and the full current will be applied to whatever load is connected to the transformer secondary.

Let us now assume that it is desired to apply less than full power per each half cycle. We have, as will be obvious, in the prior case by closing the switches 34—36, 42—40 and 46—48, short-circuited or shunted all of the control commutators 78, 94 and 102. If now it is desirable to apply a steady current, but of less value than that obtainable with the full current, this can be done by opening one of the switches to phase shift the current. Therefore, if switches 34—36 and 40—42 remain closed and switch 46—48 is opened, the commutator 78 may be so adjusted on shaft 80 that the ignition circuit, which now has to go through that commutator, will not be closed until some predetermined point after the beginning of the voltage curve and thus we can eliminate that amount of power which would ordinarily be provided to the transformer by not closing the circuit until a later point.

The ignition circuits for each of the tubes would then instead of going through line 44, switch 46—48 and line 50, now proceed through line 120, line 90, brush 88, commutator 78, brush 76 and line 74. Therefore until the commutator has rotated to a point at which the projecting and conducting portions 86 lie between the brushes 76 and 88, no igniting current can be obtained and by adjusting the commutator arcuately about the shaft 80, different delays can be obtained in firing the tubes. This will make each half cycle, whether conducted through the tube 12 or tube 58, of the same value, inasmuch as each half cycle will be delayed to the same amount.

However, let us assume that it is desired to obtain currents in which each half cycle has a different value from the preceding and succeeding ones; in other words, to give a gradually increasing or decreasing amount of energy to the load. We can now by opening switch 40—42 put commutator 94 in our igniting circuit which, as will be seen from the drawings, is set on shaft 80 at a different angular position than commutator 78. However, when commutator 94 controls the ignition circuit, it is necessary to again close switches 46—48 to shunt commutator 78 out and allow at that instant only commutator 94 to be active in its control. In other words, as soon as commutator 78 has controlled its half cycle of current, it must again be shunted and commutator 94 placed in the circuit to control the next half cycle. Therefore, as before stated, the switches 114, 116 and 118 must be accurately timed through some cam means to place the desired control commutators in or out of the circuits. The same operation of course applies to commutator 102 which is likewise placed on the shaft 80 at a still further different angular position. When switches 34—36 are closed, this commutator is shunted out, and when it is open it can control the igniting circuit if switches 40—42 and 46—48 are closed. In operating on such short time intervals, it may be necessary to utilize tubes to control current flow instead of relays 108, 110 and 112.

Figure 2:
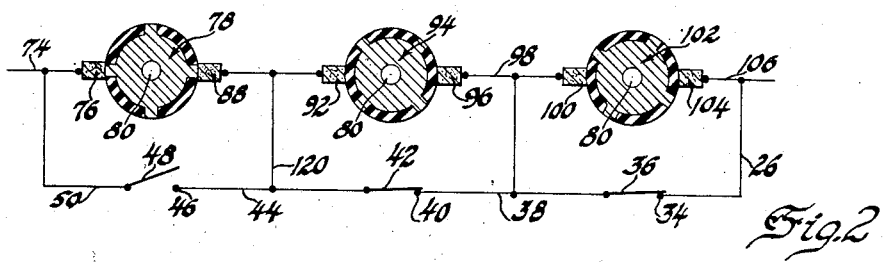
Figures 2, 3 and 4 are schematic diagrams of the commutator control portion of my system under different conditions.
Figure 3:
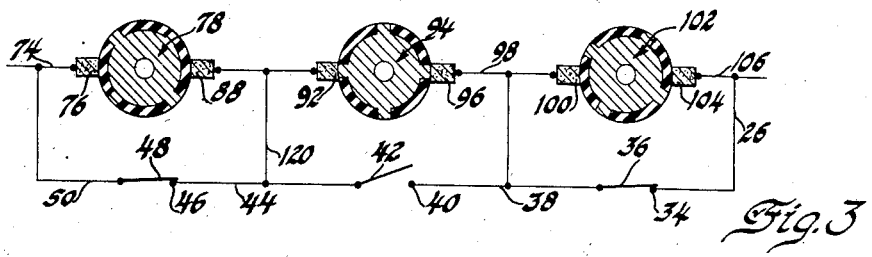
Figure 4:
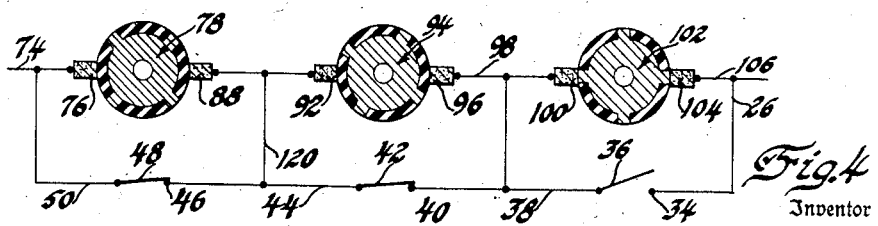

This operation of the series of commutators can perhaps better be seen by referring to Figures 2, 3 and 4 in which they alone are shown in circuit. In Figure 2 the first condition is illustrated wherein the igniting circuit between lines 50 and 26 is completed through control commutator 78, the other two commutators 94 and 102 being shunted by their switches and thus the amount of current per half cycle delivered to the load 72 is controlled by the arcuate position of this commutator on rotating shaft 80. Figure 3 illustrates the condition existing at either the next half cycle or some later operation in which the center commutator 94 now controls the firing position and therefore the amount of energy delivered per half cycle, and in Figure 4 the last commutator 102 controls the ignition point.

Figure 5:
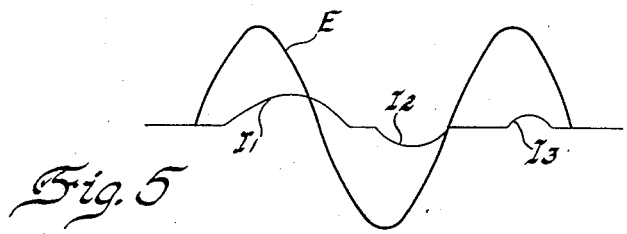
Figures 5, 6, 7 and 8 are graphs showing the wave forms obtainable by certain settings of the controls.

It will thus be obvious that with these three, or as many control commutators as desired, at different angular positions on a driven shaft, various timing of the ignition circuit may be accomplished. The shunt switches 34—36, 40—42 and 46—48 may be closed to allow either a series of half cycles to be provided from any one commutator or each adjacent half cycle may be of different value, dependent upon the particular prerequisite of the load. Figure 5 illustrates the resultant current obtainable with the three commutators as shown if they are alternately brought into operation. There is shown therein the voltage curve E and for the first half cycle of voltage applied a current $I_1$ is obtained due to the firing of the tube through commutator 78. For the next half cycle of the current, which is below the line however, commutator 94 controls the delay in timing and a current $I_2$ is obtained for this half cycle. Likewise, for the third half cycle in which the commutator 102 is retarded still further, the current obtainable at the load is indicated by $I_3$. It will therefore be noted that as the different commutators come into action to control the current with a setting as assumed, the amount of current available per half cycle would in that case decrease since the ignition point is longer delayed.

Figure 6:
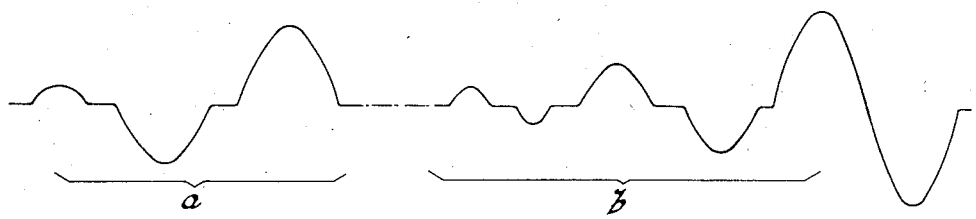
Figure 7:
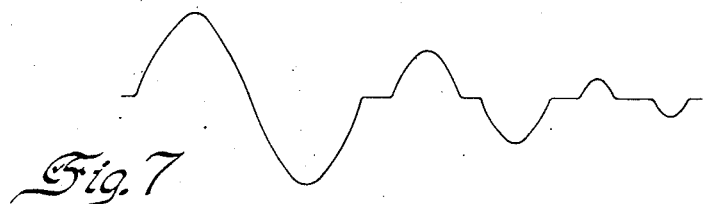
Figure 8:
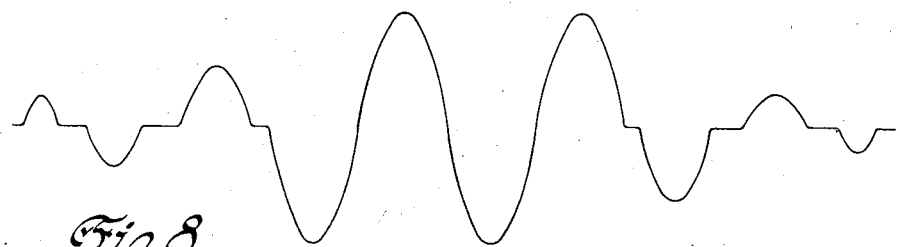

However, any arrangement of increasing or decreasing series can be obtained through the use of a plurality of commutators. In Figure 6a there are shown three successive current waves in which instead of decreasing the current increases, each successive cycle being of larger amount than that provided. In Figure 6b two half cycles are allowed to be controlled by one commutator, that is, the first two half cycles are controlled by commutator 102, the second two by 94 and the last two by 78. In this manner we get a more gradual increase in the current available at the load. Figure 7 illustrates the descending current and in that case the order of delay of the various commutators is merely reversed. In Figure 8 there is illustrated an instance where the current is increased gradually to its maximum amount and then decreased again to a small value. Thus almost any rate of increase of current up to the maximum or away from the same is available by the use of a plurality of phase control commutators and suitable switching means therefor.

Figure 9:
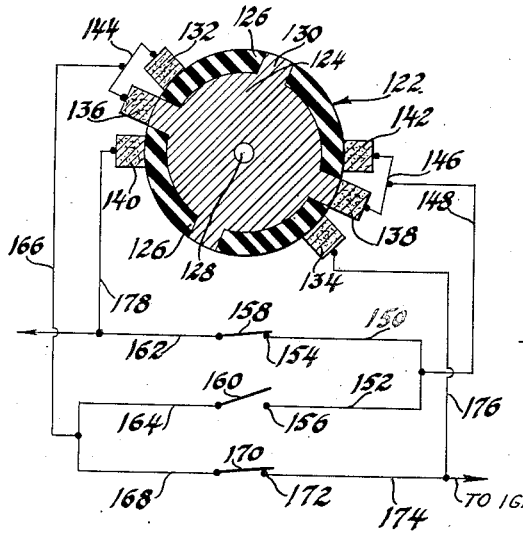
Figures 9, 10 and 11 are figures similar to Figures 2, 3 and 4 showing a modified form of control system.

The same type of operation may be obtained by the use of a single commutator element and several sets of brushes connectible thereto. As shown in Figure 9, a single commutator 122 formed as before of a central conducting portion 124 and a plurality of arcuate insulating inserts 126 is mounted upon a synchronously driven rotatable shaft 128 and again there is shown four projectible poles 130 of conducting material whose tips extend out to the surface of the arcuate inlays and which are adapted to conduct current between the various sets of brushes. Cooperating with the surface of this commutator are a plurality of sets of brushes. In this instance three are shown although any number may be used. There are brushes 132 and 134 of one set; 136 and 138 of a second set; and 140 and 142 of a third set. Brushes 132 and 136 are connected together by line 144, and brushes 142 and 138 are also connected together by line 146. Line 146 is connected by line 148 to two lines 150 and 152, the first-named terminating in stationary switch point 154 and the second terminating in stationary contact 156. These last two contacts cooperate with movable switch arms 158 and 160 respectively. Switch arm 158 is connected through line 162 to one of the ignition circuits as in Figure 1 and switch arm 160 is connected through line 164 to line 166 which extends up to line 144, and also to line 168 which is connected to a movable switch arm 170.

Stationary switch point 172 which cooperates with the last-named switch arm is connected through line 174 to the other igniter terminal and also to line 176 which extends to brush 134. Line 178 connects line 162 with brush 140. In this instance if switches 158 and 170 are closed and switch 160 is open as shown, then the ignition circuit will be completed at the time that the projecting portions 130 of the commutator lie between the brushes 136 and 138 as shown in this figure through the following circuit: from line 162, switch 158, line 150, line 148, line 146, brush 138, through the commutator 124, brush 136, line 144, line 166, line 168, switch 170, line 174 to the opposite igniter terminal and thus the angular position of the brushes 136 and 138 will determine the firing point of the tubes.

Figure 10:
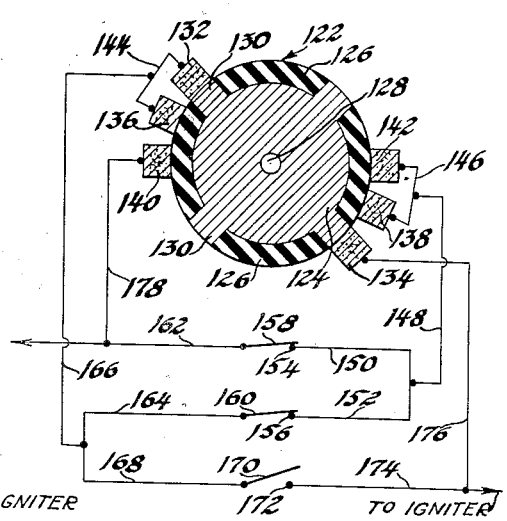
Figure 11:
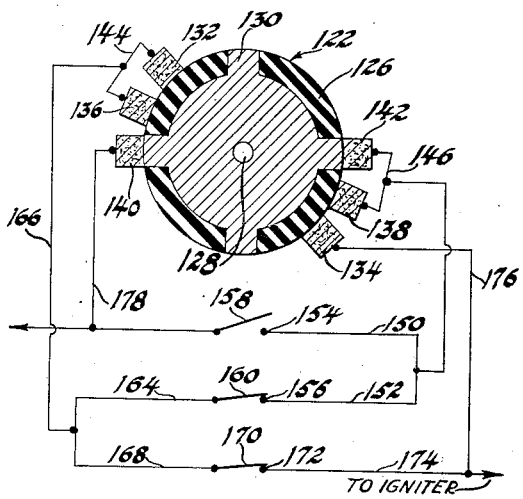

If, however, we desire more delay and therefore less current to flow per half cycle, it would be desirable for us to have the circuit fired when the commutator is in alignment with the brushes 132 and 134 which is that condition shown in Figure 10, namely, with switch 170 open and switches 158 and 160 closed. The completed circuit therefore is from line 162, through switch 158, line 150, line 152, switch 160, line 164, line 166, line 144, brush 132, commutator 124, brush 134, line 176 to the igniter. On the other hand, if it is desired to have less phase shifting and therefore more current than in either of the previous cases, it is desired to connect into the ignition circuit the brushes 140 and 142 which condition is illustrated in Figure 11, and it is believed that it will not be necessary to again trace in detail this circuit. The igniting circuits are of course closed once each 90° of commutator rotation. Therefore, as in the previous case, by opening and closing the various switches in timed relation, we can vary the amount of phase shift per half cycle and obtain any combination desired.

Figure 12:
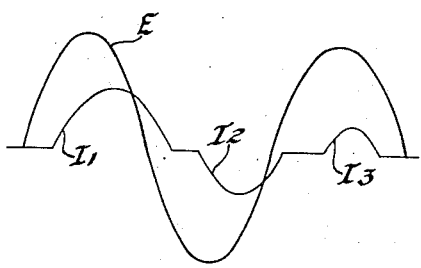
Figure 12 is a graph illustrating wave forms of current obtainable with this system.

Figure 12 is similar to Figure 5 but shows the current waves obtainable by the last described construction. Again there is a voltage wave E and a series of current waves, each successive wave being controlled by a different set of brushes. The first $I_1$ would be obtainable through brushes 140—142, assuming a clockwise rotation of the shaft; the second $I_2$ through brushes 136—138; and the last $I_3$ through brushes 132—134. It will therefore be obvious that I have provided as herein described control means whereby any desired degree of current per half cycle may be obtained at a load, which degree of current may be decreased, increased, or maintained constant per succeeding half cycles as required by the particular load being fed by the device.

I claim:

1. In a control system, a load, a source of power, a pair of arc discharge devices connected in inverse relation between the source and load, igniting means for the devices and a plurality of commutator brush assemblies connected to the igniting means to selectively control the instant of ignition of the arc discharge devices to in turn control the power delivered to the load.

2. In a control system, a load, a source of power, a pair of arc discharged devices connected in inverse relation between the load and the source of power, igniting means for the arc discharge devices, an ignition circuit including a plurality of adjustable brush commutator units selectively connectible therein whereby the instant of ignition of the arc discharge devices can be selectively controlled to provide varying amounts of power to the load.

3. In a control system, a load, a source of power, a pair of arc discharge devices connected in inverse relation between the load and the source of power, igniting means for the arc discharge devices, an ignition circuit including a plurality of adjustable brush commutator units, switches for selectively connecting any one of the units actively into the ignition circuit or shunting the same and means for operating said switches.

4. In a control system, a load, a source of power, a pair of mercury arc tubes connected in inverse relation between the load and source of power whereby each tube will control alternate half cycles of current to the load, igniting means for each tube to start the same conducting, common control means for both igniting means including a plurality of adjustable commutator brush units set at different timing positions and selectively connectible to the ignition means or shunted out with respect thereto whereby each half cycle of current to the load may be controlled and varied.

5. In a control system, a load, a source of power, a pair of arc discharge devices connected in inverse relation between the source of power and the load, igniting means for said devices, a plurality of commutator means having their conducting portions at different angular positions commonly driven, cooperating brushes engaging each commutator and all conductively serially connected to the igniting means and switch controlled shunt circuits for each set of brushes.

6. In a control system, a load, a source of power, a pair of arc discharge devices connected in inverse relation between the source of power and the load, igniting means for said devices, commutator means, a plurality of sets of brushes mounted at different angular positions around the commutator means and means for conductively connecting the brushes to the ignition means or selectively shunt the same.

KARL SARAFIAN.